United States Patent
Warner

(10) Patent No.: US 7,832,518 B2
(45) Date of Patent: Nov. 16, 2010

(54) TORQUE DISTRIBUTION CONTROL IN A MOTOR VEHICLE

(75) Inventor: Matthew A. Warner, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 694 days.

(21) Appl. No.: 11/726,501

(22) Filed: Mar. 22, 2007

(65) Prior Publication Data

US 2008/0234906 A1    Sep. 25, 2008

(51) Int. Cl.
*B60K 17/34* (2006.01)
(52) U.S. Cl. .................. 180/233; 477/143; 477/158; 477/164; 477/174; 477/180
(58) Field of Classification Search ............ 180/233; 477/143, 158, 159, 161, 164, 170–176, 180, 477/181
See application file for complete search history.

(56) References Cited

U.S. PATENT DOCUMENTS

| | | | | |
|---|---|---|---|---|
| 3,988,951 A * | 11/1976 | Mair et al. | ...... | 477/36 |
| 4,705,134 A * | 11/1987 | Kitade | ...... | 180/233 |
| 4,708,227 A * | 11/1987 | Kitade | ...... | 477/171 |
| 4,711,333 A * | 12/1987 | Okamura | ...... | 477/176 |
| 5,090,510 A * | 2/1992 | Watanabe et al. | ...... | 180/197 |
| 5,197,566 A * | 3/1993 | Watanabe et al. | ...... | 180/249 |
| 5,921,885 A * | 7/1999 | Tabata et al. | ...... | 477/107 |
| 6,189,643 B1 * | 2/2001 | Takahashi et al. | ...... | 180/248 |
| 6,283,893 B1 * | 9/2001 | Fritzner et al. | ...... | 477/176 |
| 6,493,624 B2 * | 12/2002 | Nishida et al. | ...... | 701/89 |
| 6,634,984 B1 * | 10/2003 | Doering et al. | ...... | 477/107 |
| 6,729,426 B2 * | 5/2004 | Suzuki | ...... | 180/197 |
| 6,843,338 B2 * | 1/2005 | Ohtsu | ...... | 180/233 |
| 6,902,511 B2 * | 6/2005 | Shimizu et al. | ...... | 477/4 |
| 6,908,411 B2 * | 6/2005 | Shimizu et al. | ...... | 477/5 |
| 6,991,585 B2 * | 1/2006 | Colvin et al. | ...... | 477/174 |
| 7,392,871 B2 * | 7/2008 | Severinsky et al. | ...... | 180/65.28 |
| 7,530,924 B2 * | 5/2009 | Brevick | ...... | 477/176 |
| 2003/0010559 A1 * | 1/2003 | Suzuki | ...... | 180/233 |
| 2003/0130782 A1 * | 7/2003 | Check et al. | ...... | 701/91 |
| 2003/0141128 A1 * | 7/2003 | Hessmert et al. | ...... | 180/233 |
| 2005/0037894 A1 * | 2/2005 | Michioka | ...... | 477/180 |
| 2005/0150702 A1 * | 7/2005 | Matsuzaki | ...... | 180/197 |
| 2005/0250618 A1 * | 11/2005 | Colvin et al. | ...... | 477/174 |
| 2006/0249323 A1 * | 11/2006 | Kurata | ...... | 180/233 |

* cited by examiner

*Primary Examiner*—Lesley Morris
*Assistant Examiner*—Michael R Stabley
(74) *Attorney, Agent, or Firm*—David B. Kelley; MacMillan, Sobanski & Todd, LLC

(57) ABSTRACT

In a vehicle powertrain that continually transmits power to a first set of vehicle wheels and selectively transmits power through a clutch to a second set of vehicle wheels, a method for controlling the clutch includes determining that brakes for slowing the vehicle wheels are applied and that an accelerator pedal of the vehicle is depressed less than a reference magnitude, determining that the rate of change of the average front wheel speed is greater than the rate of change of the average rear wheel speed, and setting the torque capacity of the clutch to a target magnitude.

11 Claims, 3 Drawing Sheets

TORQUE DISTRIBUTION CONTROL IN A MOTOR VEHICLE

BACKGROUND OF THE INVENTION

1. Field of the Invention

This invention relates generally to transmitting rotating power in a motor vehicle driveline. More particularly, it pertains to controlling a torque distribution clutch while braking a vehicle on a slippery road or any surface having a relatively low coefficient of friction.

2. Description of the Prior Art

A four wheel drive (4WD) powertrain of a motor vehicle includes an engine, a transmission for producing multiple forward speeds and reverse drive, and a transfer case, which continually connects the transmission output to a rear drive shaft and selectively connects the transmission output to both the front wheels and rear wheels when a four-wheel drive mode of operation is selected. A transfer clutch located in the transfer case directs more torque to the front wheels as the torque capacity of the clutch is increased in response to actuation by a clutch servo, which is usually controlled by an electronic controller.

When the wheel brakes of a vehicle equipped with a 4WD powertrain are applied while the vehicle is on a slipper road surface, transient vibrations can be produced in the powertrain due to these conditions. Wheel brake biasing with electronic brake distribution along with an increased anti-lock brake system speed threshold can cause the average front wheel speeds to decelerate much faster than the rear average wheel speeds. While this speed differential is present, the wheel slip control of the 4×4 control system can cause an increase in the transfer clutch torque capacity, thereby causing the rear wheels to lock up cyclically, repeated bumps, and torque disturbance.

There is a need in the industry to avoid such objectionable operation by controlling the transfer clutch when the vehicle operates under conditions that cause the objectionable transients.

SUMMARY OF THE INVENTION

Wheel slip control is a major function in the 4×4 control of the transfer clutch. To minimize the performance risk, wheel slip control is activated when the wheel brakes are applied and while the vehicle operates on a slippery surface. Under those conditions, the slip control contribution to the 4×4 clutch duty cycle is limited.

In a vehicle powertrain that continually transmits power to a first set of vehicle wheels and selectively transmits power through a clutch to a second set of vehicle wheels, a method for controlling the clutch includes determining that brakes for slowing the vehicle wheels are applied and that an accelerator pedal of the vehicle is depressed less than a reference magnitude, determining that the rate of change of the average front wheel speed is greater than the rate of change of the average front wheel speed, and setting the torque capacity of the clutch to a target magnitude target.

By limiting the magnitude of torque transmitted through the clutch while braking the vehicle, the contribution of wheel slip control to the clutch duty cycle is limited, thereby avoiding transient disturbances in the powertrain while braking the vehicle on a slippery surface.

A system for controlling the transmittal of torque to first and second sets of vehicle wheels in a vehicle powertrain includes speed sensors producing signals that represent the speed of the front and rear vehicle wheels, a sensor producing a signal that represents the state of the engine throttle or accelerator pedal position, a sensor producing a signal indicating whether the wheel brakes are applied, a clutch having a variable torque capacity for selectively transmitting torque to one of the first and second sets of vehicle wheels, and a controller communicating with the sensors and the clutch. The controller is configured to determine that the wheel brakes are applied, that the engine throttle is open less than a reference magnitude or the accelerator pedal is depressed less than a reference magnitude, that the rate of change of the average front wheel speed is greater than the rate of change of the average rear wheel speed, and to set the torque capacity of the clutch to a target magnitude.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
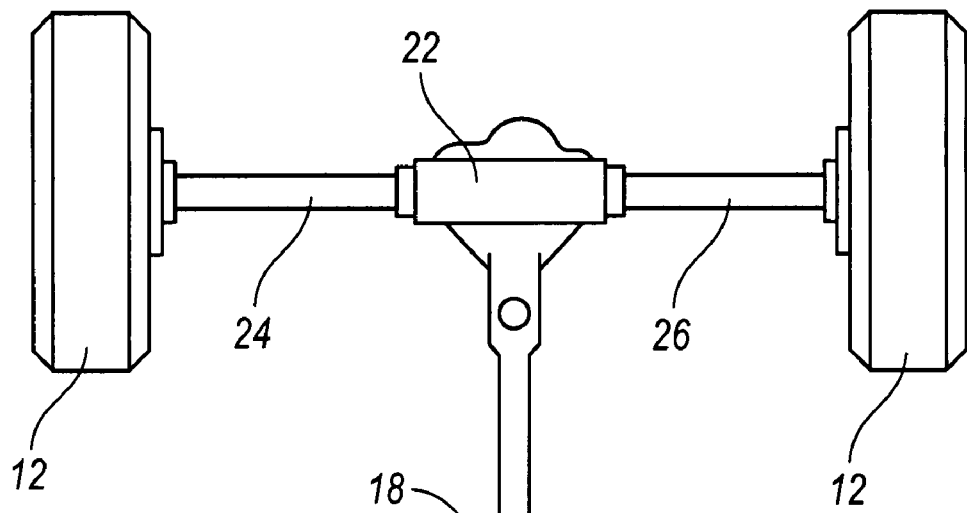
FIG. 1 is a top view of a motor vehicle driveline that includes a transmission, transfer case, front and rear drive shafts, and shafts extending to front wheels and rear wheels.
Figure 1:
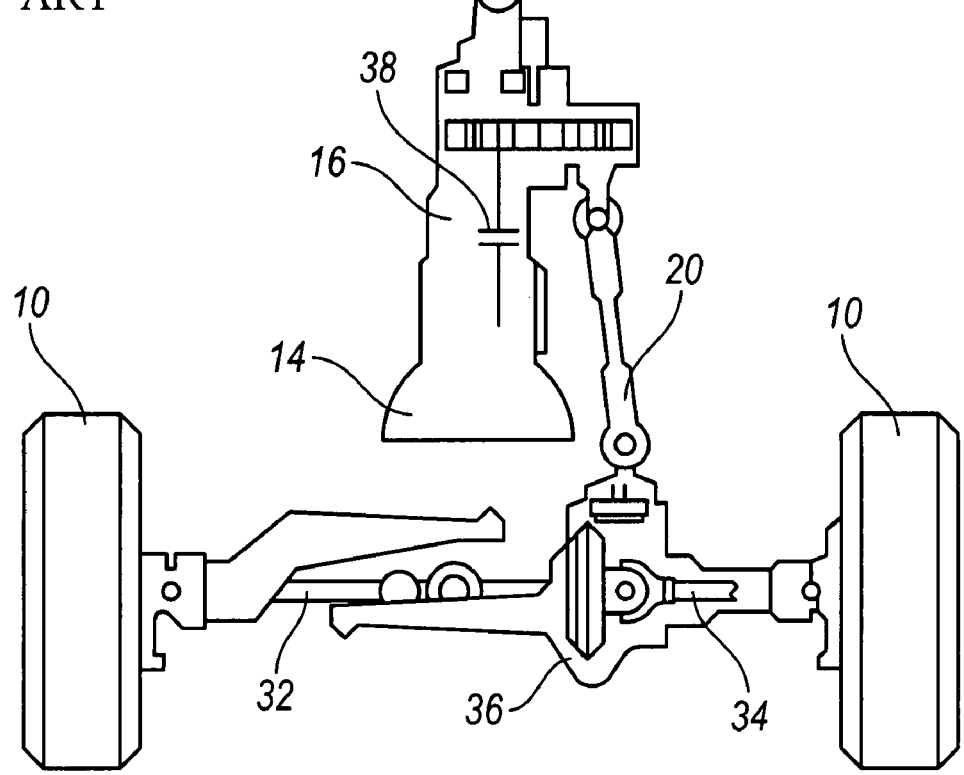

With reference now to the drawings and particularly to FIG. 1, the powertrain of a motor vehicle, to which the present invention can be applied, includes front and rear wheels 10, 12, a power transmission 14 for producing multiple forward and reverse speed ratios driven by an engine (not shown), and a transfer case 16 for continuously driveably connecting the transmission output to a rear drive shaft 18. The transfer case 16 selectively connects the transmission output to both the front drive shaft 20 and rear drive shaft 18 when a four-wheel drive mode of operation is selected, either manually or electronically. Shaft 18 transmits power to a rear wheel differential mechanism 22, from which power is transmitted differentially to the rear wheels 12 through axle shafts 24, 26, which are contained within a differential housing. The front wheels are driveably connected to right-hand and left-hand halfshafts 32, 34, to which power is transmitted from the front drive shaft 20 through a front differential mechanism 36.

The transfer case assembly 16 continually transmits rotating power to the rear driveshaft 18 and rear wheels 12, which is the primary power path. The transfer case 16 intermittently transmits rotating power to the front driveshaft 20 and the front wheels 10, which is the secondary power path, when a clutch 38, located in the transfer case, is actuated. Preferably clutch 38 is electromagnetically-actuated having a variable torque transmitting capacity whose magnitude is determined by a command signal having a pulse-width-modulated (PWM) duty cycle. Alternatively, clutch 38 may be hydraulically-actuated having a variable torque transmitting capacity, whose magnitude is determined by the magnitude of pressure supplied to a servo that actuates clutch 38. In either case, when the magnitude of clutch torque capacity increases, the magnitude of torque transmitted to front drive shaft 20 increases and the magnitude of torque transmitted to rear drive shaft 18 decreases.

Figure 2:
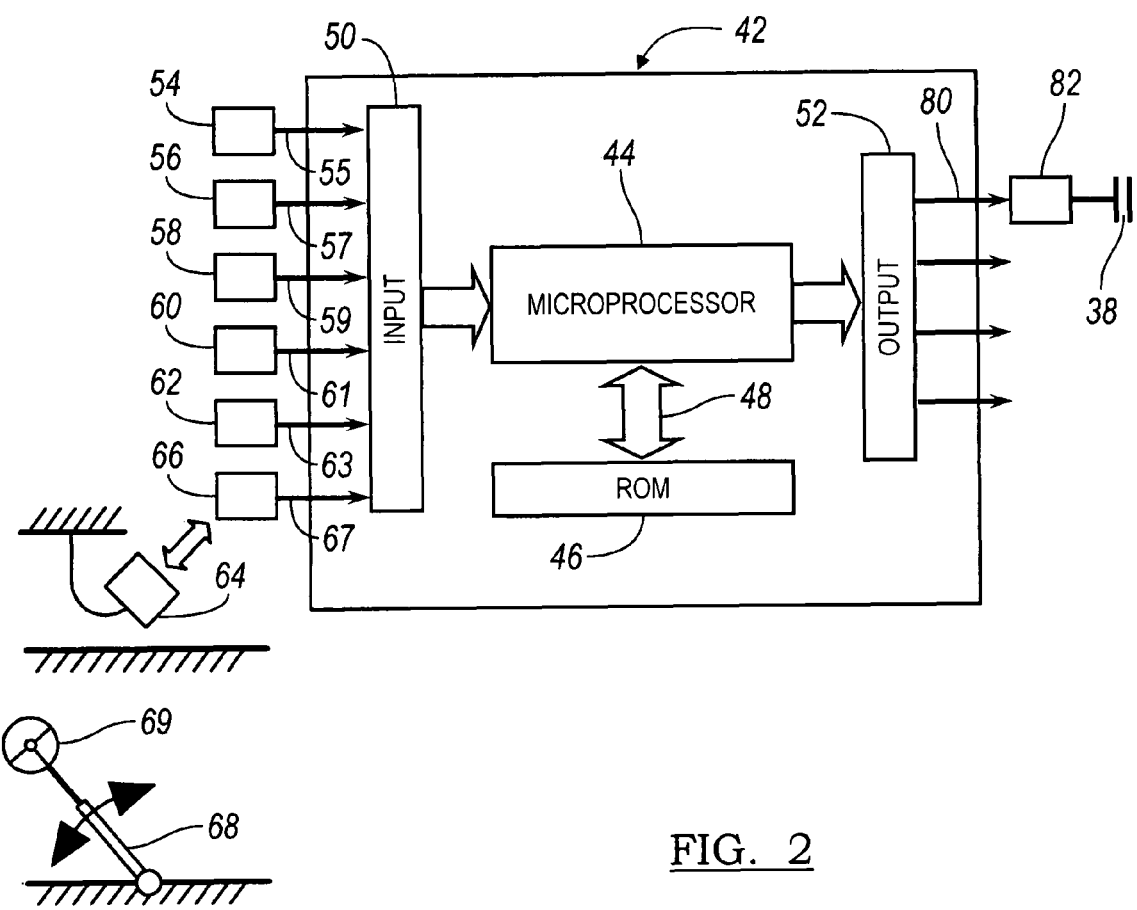
FIG. 2 is a schematic diagram of an electronic controller for controlling the torque converter clutch.

FIG. 2 illustrates a system 40 for controlling operation of clutch 38. The system includes a controller 42 comprising an electronic microprocessor 44 accessible to electronic memory 46, which contains control algorithms; a data communication bus 48 interconnecting components of the controller; inlet ports 50 communicating the controller with various powertrain sensors, and outlet ports 52 communicating command signals from the controller to clutch 38, which commands control the clutch in response to the results produced by execution of the algorithms.

Speed sensors 54, 56, each repetitively produce an electronic signal 55, 57, each signal representing the speed of one of the front wheels 10, the signals being supplied as input through input port 50 to the controller 42. Similarly, speed sensors 58, 60, each repetitively produce an electronic signal 59, 61, each signal representing the speed of one of the rear wheels 12, the signals being supplied as input to the controller 42.

A position sensor 62 produces an electronic signal 63 representing the degree to which the foot brake pedal 64 is depressed or a switch representing whether the brake pedal is on or off, signal 63 also being supplied as input to the controller 42.

Similarly, a position sensor 66 produces an electronic signal 67 representing the degree to which the engine throttle 69 is open or the degree to which the accelerator pedal 68 is depressed, that signal also being supplied as input to the controller 42. Accelerator pedal 68 controls the state of an engine throttle 69, i.e., the degree to which the engine throttle is open. Air or an air-fuel mixture enters the engine through the engine throttle 69, but the throttle opening may be controlled by an electronic throttle system in response to displacement of the pedal and other factors, rather than by direct control of the accelerator pedal 68.

Figure 3:
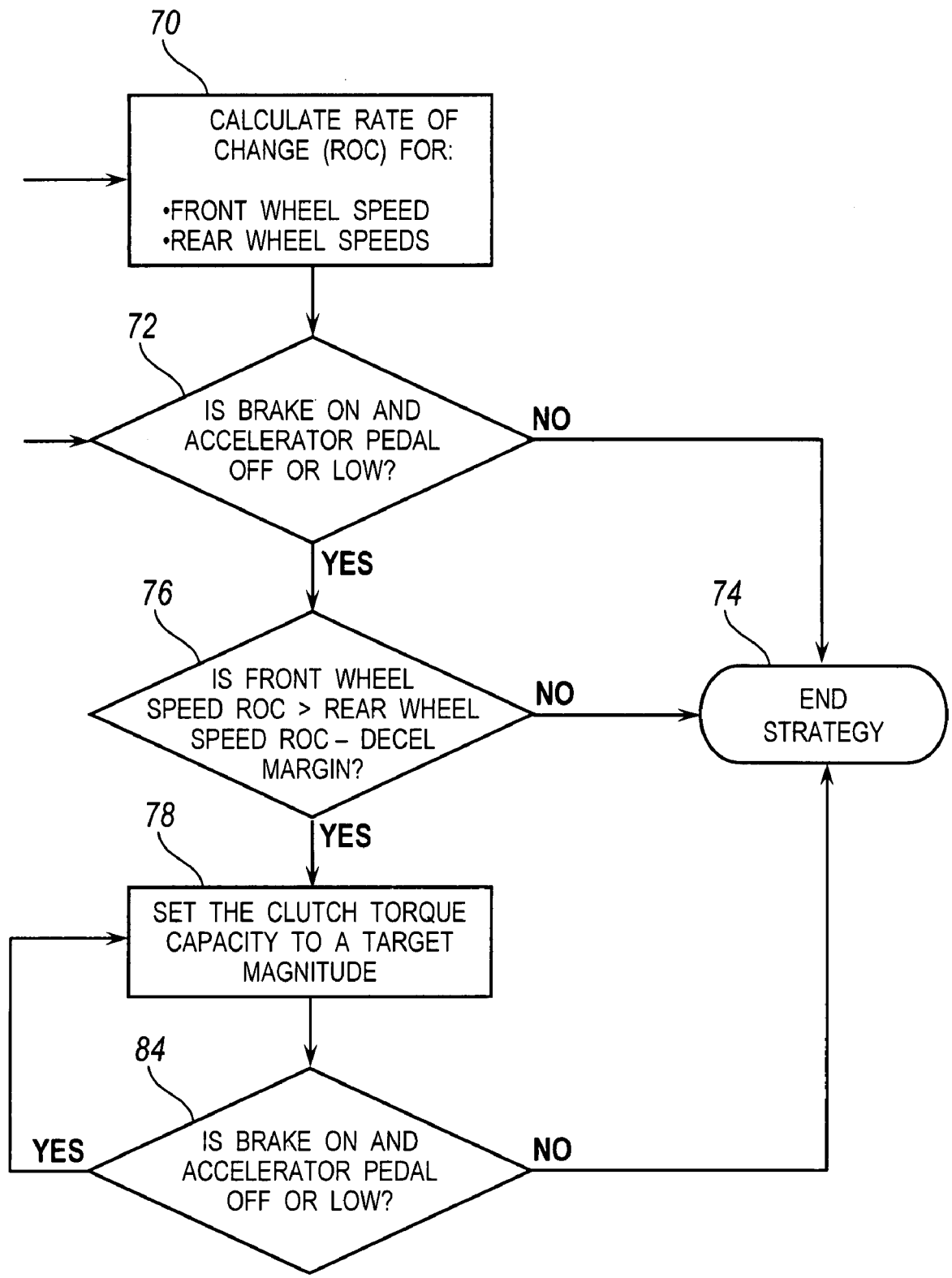
FIG. 3 is a schematic diagram showing method steps of an algorithm for controlling the torque converter clutch.

FIG. 3 is a schematic diagram showing method steps of an algorithm for controlling clutch 38. At step 70, controller 42 uses the wheel speed signals to calculate the rate of change of the average front wheel speed and the average rear wheel speed over the most recent sampling interval or over multiple intervals.

At 72, a test is made to determine whether the brake pedal 64 is depressed and whether the accelerator pedal is either off or depressed less than a reference displacement. If the outcome of test 72 is logically false, control passes to step 74, where the algorithm is ended.

If the result of test 72 is true, control passes to step 76, where a test is made to determine whether the rate of change of front wheel speed is greater than the rate of change of rear wheel speed minus a rear wheel speed deceleration margin, which may be about 0.2 kph. The vehicle speed at which this control is likely to be operative is about 8 kph. If the outcome of test 76 is logically false, control passes to step 74, where the algorithm is ended.

If the result of test 76 is true, which would likely occur when the average front wheel speed is less than the average rear wheel speed, control passes to step 78, where the controller 42 issues a command signal 80 to the servo 82 that actuates clutch 38. In response to signal 80, the PWM duty cycle is adjusted to and maintained at a target duty cycle of about 2 percent, which is generally sufficient to take up any clearance or lash among the components that transmit power from clutch 38 to the front wheels 10. By limiting the magnitude of torque transmitted through clutch 38 while braking the vehicle, the contribution of wheel slip control to the clutch duty cycle is limited, thereby avoiding transient disturbances in the powertrain while braking the vehicle on a slippery surface.

At step 84, a test is made to determine whether the brake pedal is depressed and the accelerator pedal is either off or depressed less than a reference magnitude. If the outcome of test 80 is logically false, control passes to step 74, where the algorithm is ended. If the outcome of test 80 is logically true, control returns to step 78.

By limiting the magnitude of torque transmitted through clutch 38 while braking the vehicle, the contribution of wheel slip control to the clutch duty cycle is limited, thereby avoiding transient disturbances in the powertrain while braking the vehicle on a slippery surface.

In accordance with the provisions of the patent statutes, the preferred embodiment has been described. However, it should be noted that the alternate embodiments can be practiced otherwise than as specifically illustrated and described.

What is claimed is:

1. A method for controlling a transfer case clutch, comprising:
   (a) determining that vehicle wheel brakes are applied;
   (b) determining that an accelerator pedal of the vehicle is depressed less than a reference magnitude;
   (c) determining repetitively that a rate of change of the average front wheel speed is greater than a rate of change of the average rear wheel speed; and
   (d) setting the torque capacity of the clutch to a target magnitude.

2. The method of claim 1 wherein step (c) further comprises the steps of:
   determining repetitively the speed of the front and rear vehicle wheels;
   determining repetitively an average speed of the front vehicle wheels and an average speed of the rear vehicle wheels; and
   using the average speed of the front and rear vehicle wheels to determine the rate of change of the average speed of the front vehicle wheels.

3. The method of claim 1 wherein step (d) further comprises the step of:
   setting a duty cycle of a servo that actuates the clutch to a predetermined magnitude.

4. The method of claim 3 wherein the duty cycle is set to two percent.

5. The method of claim 1 wherein step (d) further comprises the step of:
   setting a pressure in a servo that actuates the clutch to a predetermined magnitude.

6. The method of claim 1 further comprising the step of varying a torque capacity of the clutch if either the accelerator pedal of the vehicle is depressed more than a reference magnitude, or the brakes for slowing the vehicle wheels are not applied.

7. A method for controlling a transfer case clutch for a vehicle, comprising:
   (a) if wheel brakes are applied and an accelerator pedal is depressed less than a reference magnitude, determining that a rate of change of an an average front wheel speed is greater than a rate of change of an average rear wheel speed; and
   (b) adjusting torque capacity of the clutch to a magnitude that removes clearances among components that transmit power from the clutch to wheels that are driven from through clutch.

8. The method of claim 7 wherein step (a) further comprises the steps of:
   determining repetitively a speed of the front and rear vehicle wheels;
   determining repetitively an average speed of the front vehicle wheels and an average speed of the rear vehicle wheels; and
   using the average speed of the front and rear vehicle wheels to determine the rate of change of the average speed of the front vehicle wheels.

9. The method of claim 7 wherein step (b) further comprises the step of:
   setting a duty cycle of a servo that actuates the clutch to a predetermined magnitude.

10. The method of claim 7 wherein step (b) further comprises the step of setting the pressure in a servo that actuates the clutch to a predetermined magnitude.

11. The method of claim 7 further comprising the step of varying the torque capacity of the clutch if either the accelerator pedal of the vehicle is depressed more than a reference magnitude, or the brakes for slowing the vehicle wheels are not applied.

* * * * *